(12) United States Patent
Taguchi et al.

(10) Patent No.: US 6,556,786 B2
(45) Date of Patent: Apr. 29, 2003

(54) CAMERA

(75) Inventors: Ichiro Taguchi, Saitama (JP); Shinya Suzuka, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/062,416

(22) Filed: Feb. 5, 2002

(65) Prior Publication Data

US 2002/0106203 A1 Aug. 8, 2002

(30) Foreign Application Priority Data

Feb. 7, 2001 (JP) ........................................ 2001-030777

(51) Int. Cl.$^7$ .............................. G03B 5/00; G03B 17/02
(52) U.S. Cl. .......................... 396/85; 396/536; 396/543
(58) Field of Search .............................. 396/85–87, 536, 396/535, 543, 131

(56) References Cited

U.S. PATENT DOCUMENTS

| | | | |
|---|---|---|---|
| 3,186,319 A | * 6/1965 | Hochstein | ............... 396/543 X |
| 3,517,597 A | * 6/1970 | Rauffer | ........................ 396/85 |
| 4,445,757 A | * 5/1984 | Enomoto et al. | ......... 396/86 X |
| 4,751,538 A | * 6/1988 | Konno | ........................ 396/543 |
| 5,579,069 A | * 11/1996 | Park | ...................... 396/543 X |
| 5,970,261 A | * 10/1999 | Ishiguro et al. | ................ 396/85 |
| 6,018,632 A | * 1/2000 | Takamura | .................... 396/85 |
| 6,223,000 B1 | * 4/2001 | Funakoshi et al. | ...... 396/543 X |
| 6,424,806 B1 | * 7/2002 | Ohmura et al. | ......... 396/543 X |

* cited by examiner

Primary Examiner—W. B. Perkey
(74) Attorney, Agent, or Firm—Greenblum & Bernstein, P.L.C.

(57) ABSTRACT

There is provided a camera including a camera body having an inner space, a cover mounted to said camera body to open and close said inner space, and an operation member movably mounted to said cover. The operation member is manually operable from outside said camera. The camera further includes at least one switch provided in said camera body, and a motion transmitting mechanism provided between the at least one switch and the operation member. The motion transmitting mechanism is provided to the camera such that it switches a status of the at least one switch in response to an operation of said operation member.

9 Claims, 8 Drawing Sheets

CAMERA

BACKGROUND OF THE INVENTION

The present invention relates to a camera, and more particularly, to a camera having a switch mechanism of which operation member is provided to a back cover of the camera.

Generally, a camera has a back cover mounted to a camera body by a hinge mechanism for open and close an inner space of the camera for accommodating a film cartridge. Recently, many cameras have switches on the back cover since a camera user can conveniently operate the switch arranged on the back cover. One example is a zoom lens camera having a switch on the back cover which is operated for varying the focal length of a zoom lens system. Each of such zoom lens cameras further has a lens moving mechanism which moves the lenses of the zoom lens system to vary the focal length, and a controller for controlling the lens moving mechanism,. each of which is provided to the camera body. The switch on the back cover is electrically connected with the controller by lead wires or a flexible board that are extending from the back cover into the camera body through the hinge mechanism.

By such cameras, however, mechanical stress is applied to the lead wires and/or the flexible board each time when the back cover is opened and closed. Such mechanical stress is not desirable since repetition of mechanical stress may break the lead wire and/or the flexible board.

Further, assembly of a camera having the above-described structure requires many additional and complicated steps for arranging the lead wires or flexible board through the hinge mechanism.

SUMMARY OF THE INVENTION

It is therefore desirable to provide an improved camera having a switch operatable from the back cover of the camera, which does not require a complicated assembly and is not damaged even if the back cover is opened and closed for many times.

Thus, the invention provides a camera including a camera body having an inner space, a cover mounted to said camera body to open and close said inner space, and an operation member movably mounted to said cover. The operation member is manually operable from outside said camera. The camera further includes at least one switch provided in said camera body, and a motion transmitting mechanism provided between the at least one switch and the operation member. The motion transmitting mechanism is provided to the camera such that it switches a status of the at least one switch in response to an operation of said operation member.

The at least one switch may include first and second switches, and the camera may execute a first operation when the first switch is ON and a second operation when the second switch is ON. Further, the motion transmitting mechanism may switch on the first switch when the operation member is at a first position, and switch on the second switch when the operation member is at a second position.

In the above case, The camera may further include a zoom lens system, a lens moving mechanism and a controller, each of which provided to the camera body. The lens moving mechanism moves one or more lenses of said zoom lens system to vary a focal length of said zoom lens system. The controller is connected to both the first and second switches and the lens moving mechanism is controlled by said controller such that the focal length decreases when the first switch is ON, and such that the focal length increases when the second switch is ON.

The inner space may be a film cartridge space for accommodating a film cartridge, and the cover is a back cover mounted to a back side of the camera body to open and close the film cartridge space.

The film cartridge space may include a shaft space formed in a back wall of the camera body, and the shaft space may accommodate a shaft which protrudes from said film cartridge. Further, the motion transmitting mechanism may be provided to the back wall at the vicinity of the shaft space.

The at least one switch of the camera according to the invention may be provided to the camera body such that a back wall of the camera body is located between the at least one switch and the operation member, and the motion transmitting mechanism may include a rod supported slidably in a through hole formed in the back wall. The rod is urged towards the at least one switch by the operation member as the operation member being moved in a predetermined direction, and thereby switches on said at least one switch.

The motion transmitting mechanism may be provided to the camera body such that the motion transmitting mechanism is disconnected from the operation member when the cover is opened.

In other cases, the motion transmitting mechanism may be provided to the back cover such that the motion transmitting mechanism is disconnected from the operation member when the cover is opened.

According to another aspect of the invention, a camera is provided which includes a camera body, a cover openably mounted onto the camera body, at least one electrical device provided in the camera body, the at least one electrical device being mechanically operated to change status thereof, a manually operable member mounted on the cover, the manually operable member being electrically disconnected from the at least one electrical device; and a motion transmitting mechanism that transmits an operation of the manually operable member to the at least one electrical device.

DETAILED DESCRIPTION OF THE EMBODIMENTS

Hereinafter, an embodiment of the invention will be described with reference to the accompanying drawings.

Figure 1:
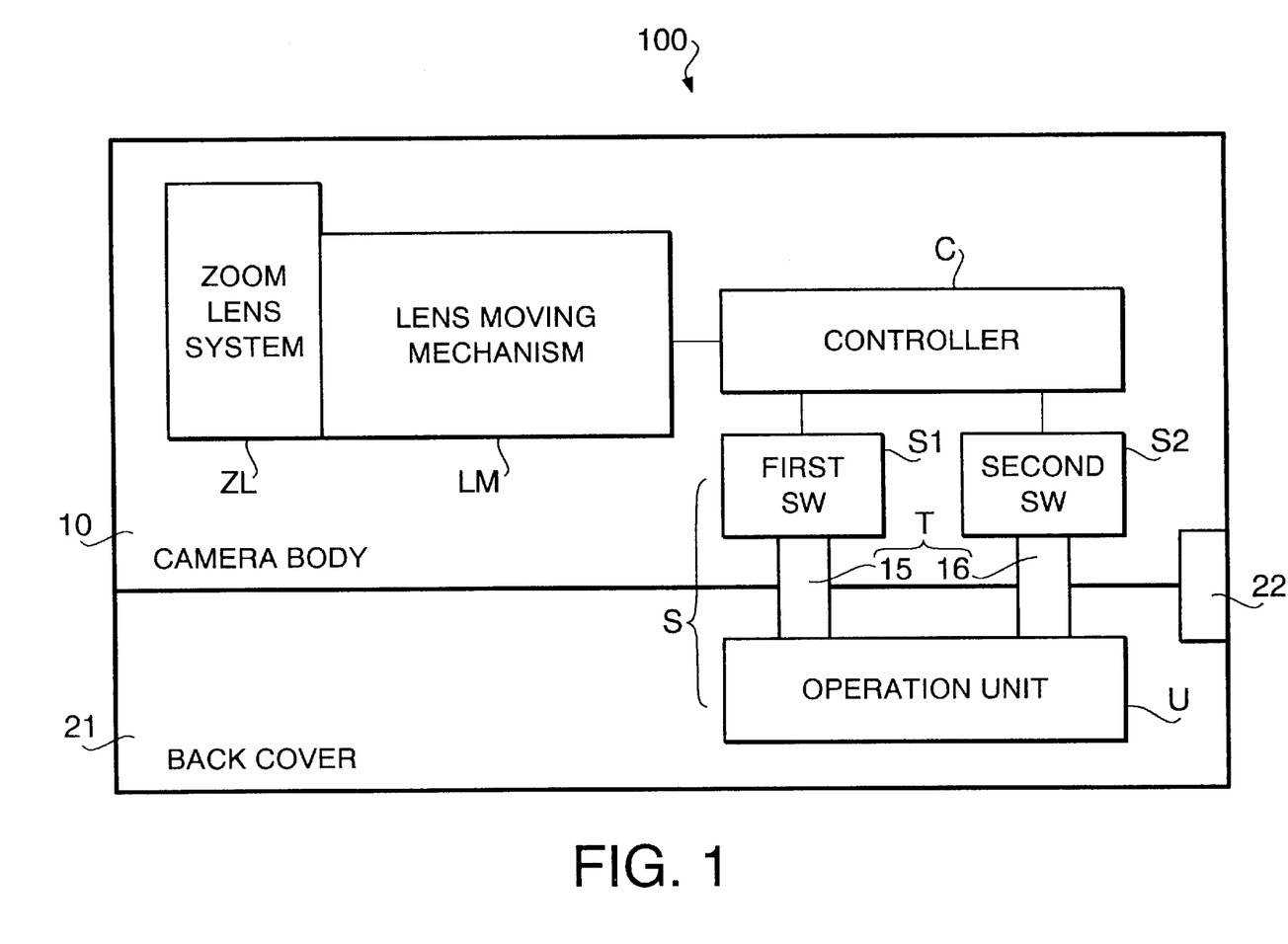
FIG. 1 is a block diagram showing main components of a zoom lens camera to which an embodiment of the invention can be applied.

FIG. 1 is a block diagram showing main components of a zoom lens camera 100 according to an embodiment of the invention. The camera 100 includes a camera body 10 and a back cover 21. The back cover 21 is mounted to the camera body 10 at one end side thereof by a hinge mechanism 22 so that the back cover 21: can be opened to allow a film cartridge to be supplied into the camera body 10.

The camera body 10 accommodates a zoom lens system ZL, a lens moving mechanism LM for varying the focal length of the zoom lens system ZL by moving one or more lenses thereof, and a controller C for controlling the actuation of the lens moving mechanism LM. The camera 100 is also provided with a switch mechanism S for controlling the controller C. The switch mechanism S includes, in the present embodiment, first and second switches S1 and S2, an operation unit U, and a motion transmitting mechanism T.

The first and second switches S1 and S2 are provided in the camera body 10 and electrically connected to the controller C. The controller C controls the lens moving mechanism LM to decrease the focal length of the zoom lens system ZL when the first switch Si is ON, and increase the focal length when the second switch S2 is ON.

The operation unit U is a mechanism mounted to the back cover such that at least a part of it can be operated to move. The motion transmitting mechanism T mechanically transmits the motion of the operation unit U to turn on either the first switch S1 or the second switch S2, depending on the position and/or the direction the operation unit U is moved. The motion transmitting mechanism T of the present embodiment includes first and second rods 15 and 16 which move in response to the motion of the operation unit U and switch on the first switch S1 or the second switches S2, as will be described later.

Figure 2A:
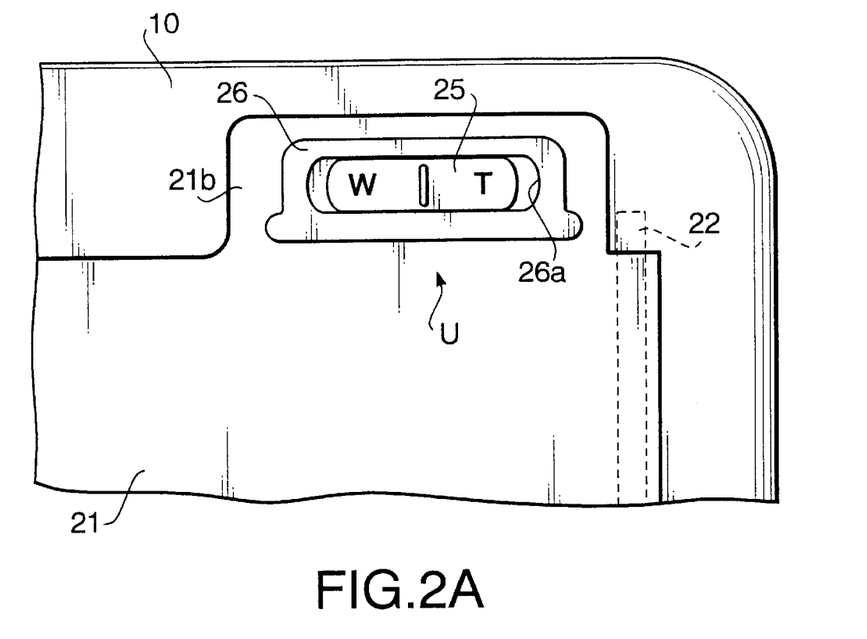
FIGS. 2a and 2b illustrate an upper right portion of a back side of the camera of FIG. 1, FIG. 2a with a back cover being mounted, and FIG. 2b with the back cover removed.
Figure 2B:
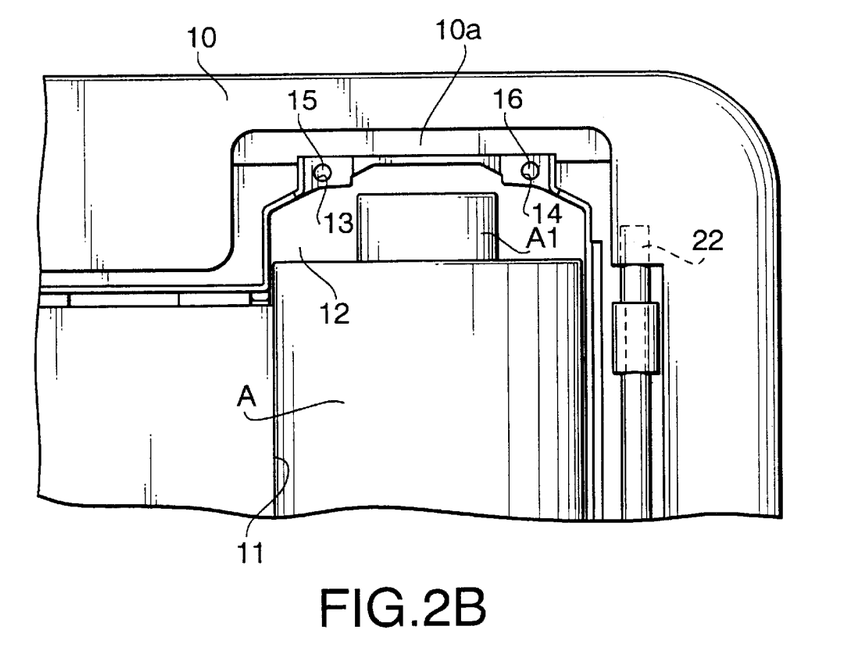

FIGS. 2a and 2b illustrate an upper right portion of a back side of the camera 100, FIG. 2a with the back cover 21 being mounted to the camera body 10, and FIG. 2b with the back cover 21 removed from the camera body 10.

As shown in FIGS. 2a and 2b, the back cover 21 is mounted to the back side of the camera body by the hinge mechanism 22. The back cover 21 pivots about the hinge mechanism 22 to open and close a film cartridge space 11 which accommodates a film cartridge A (patrone) therein. The back cover 21 has an protruding area 21b on its upper edge near the right side (in FIGS. 2a and 2b). An elongated and generally rectangular opening 21a is formed in the protruding area 21b. The operation unit U is fitted into the opening 21a, such that an operation member 25 is exposed to the outside, and is screwed to the back cover 21.

The film cartridge space 11 has a shaft space 12 at its upper end, in which a shaft (or long hub) A1 of the film cartridge A is accommodated. The shaft space 12 is generally formed in a triangular pyramid with its top cut away. A pair of through holes 13 and 14 are formed in a back wall 10a of the camera body 10, which define the shaft space 12, preferably in parallel with an optical axis of the zoom lens system ZL, one close the right side and the other close to the left side of the shaft space 12. The through holes 13 and 14 are provided for slidably holding the first and second rods 15 and 16, respectively, as will be described later.

Figure 3A:
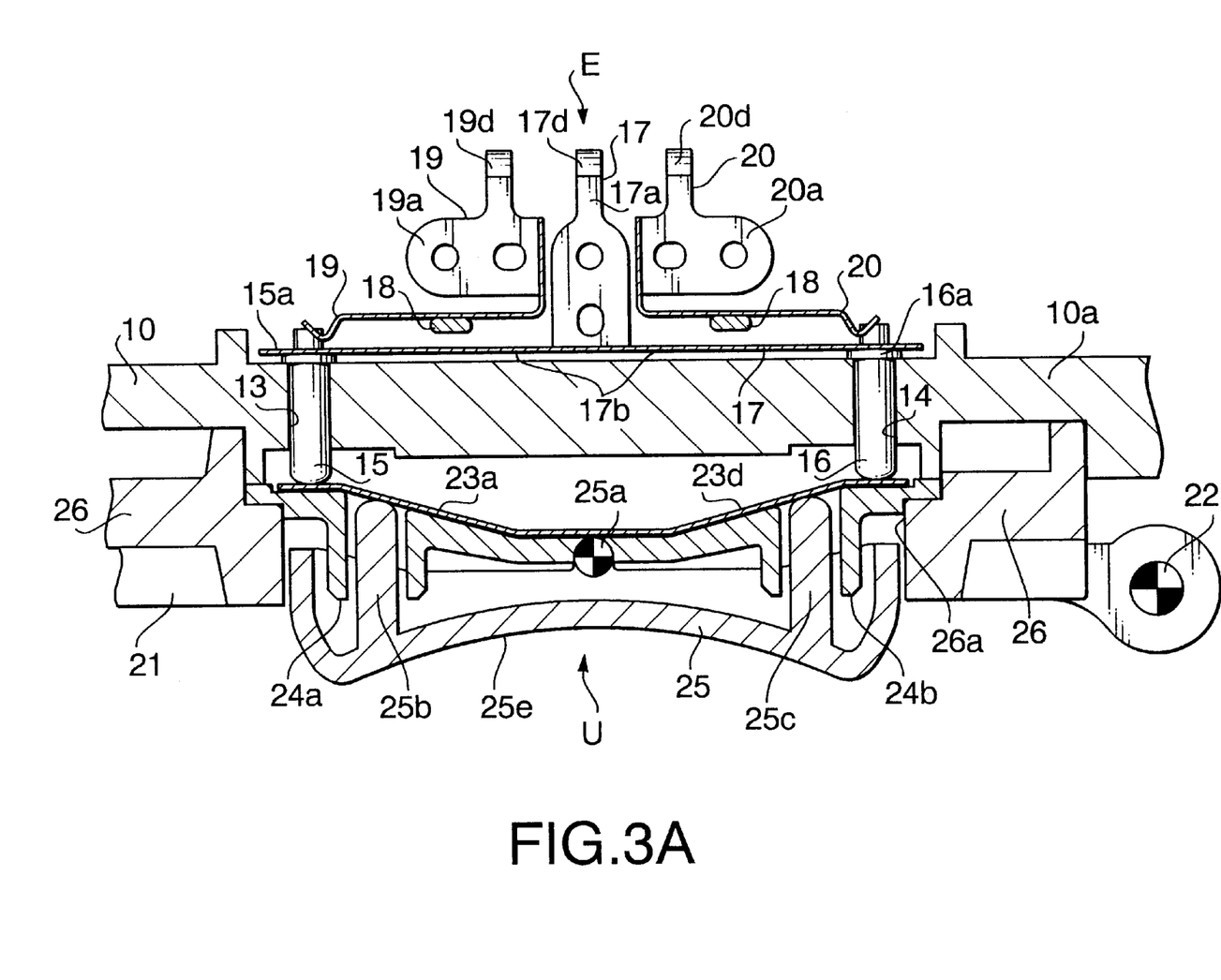
FIGS. 3a through 3c are partial cross-sectional views of the camera of FIG. 2, FIG. 3a showing the cross-section when an operation unit is not operated, and FIGS. 3b and 3c showing the cross-section when the operation unit is operated.
Figure 3B:
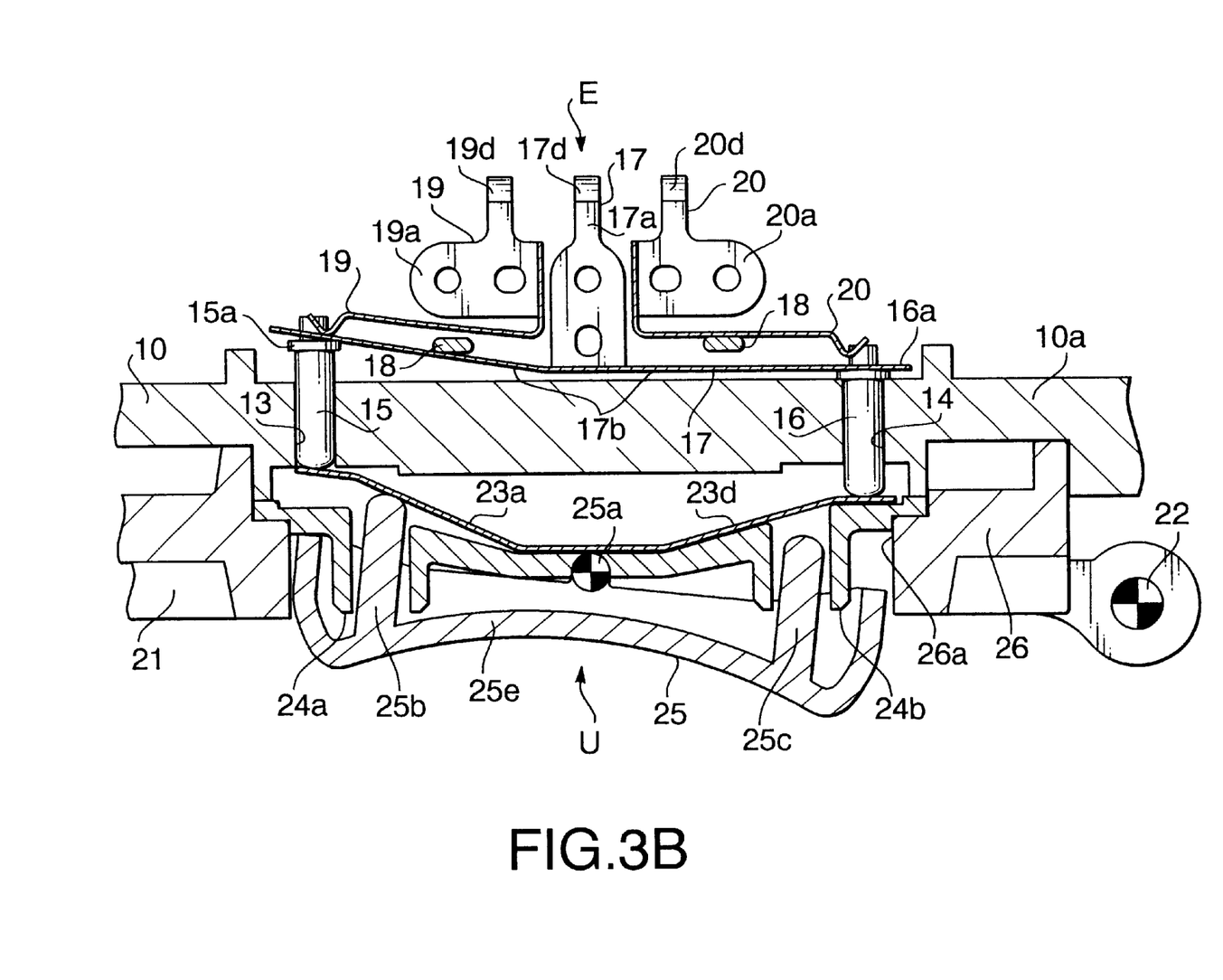
Figure 3C:
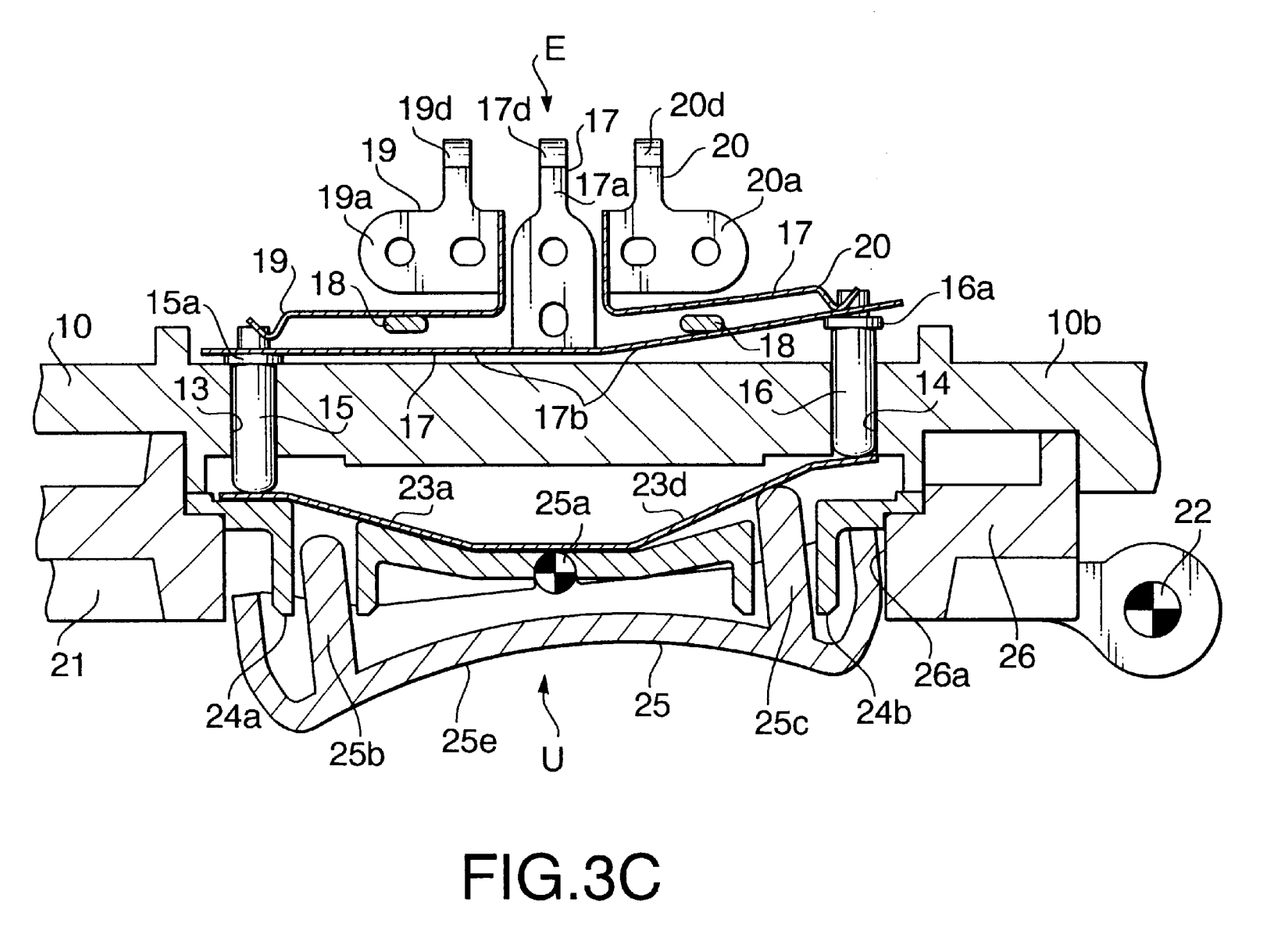

FIGS. 3a through 3c are partial cross-sectional views of the camera 100 taken along a plane that includes both center axes of the through holes 13 and 14. FIG. 3a shows the cross-section of the camera 100 when the operation unit U is not operated (i.e., at its neutral position), and FIGS. 3b and 3c show the cross-section when the operation unit U is operated to turn on the first switch S1 and the second switch S2, respectively. In FIGS. 3a though 3c, the upper and lower sides correspond to the front and back sides of the camera 100, respectively.

As shown in FIG. 3a, the first and second rods 15 and 16 are arranged in the through holes 13 and 14, respectively, formed in the back wall 10a of the camera body 10, with both front and rear ends projecting from the through holes 13 and 14. Flanges 15a and 16a are formed close to the front end of the first and second rods 15, respectively. The outer diameter of the flanges 15a and 16a are defined larger than the inner diameter of the through holes 13 and 14 so that the flanges 15a and 16a restricts the backward movement of the rods 15 and 16 by abutting against the back wall 10a.

A switch unit E that includes the first and second switches S1 and S2, which are described with reference to FIG. 1, are provided in front of the back wall 10a.

Figure 4:
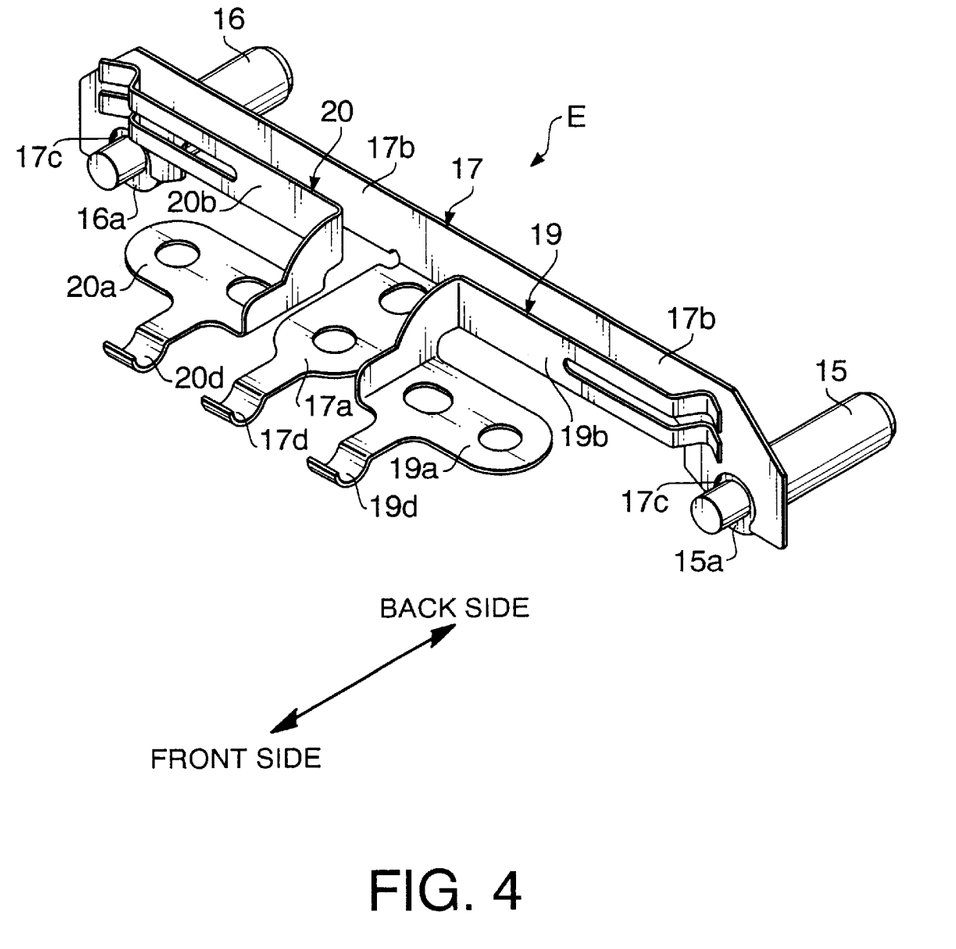
FIG. 4 shows a perspective view of a switch unit.
Figure 5:
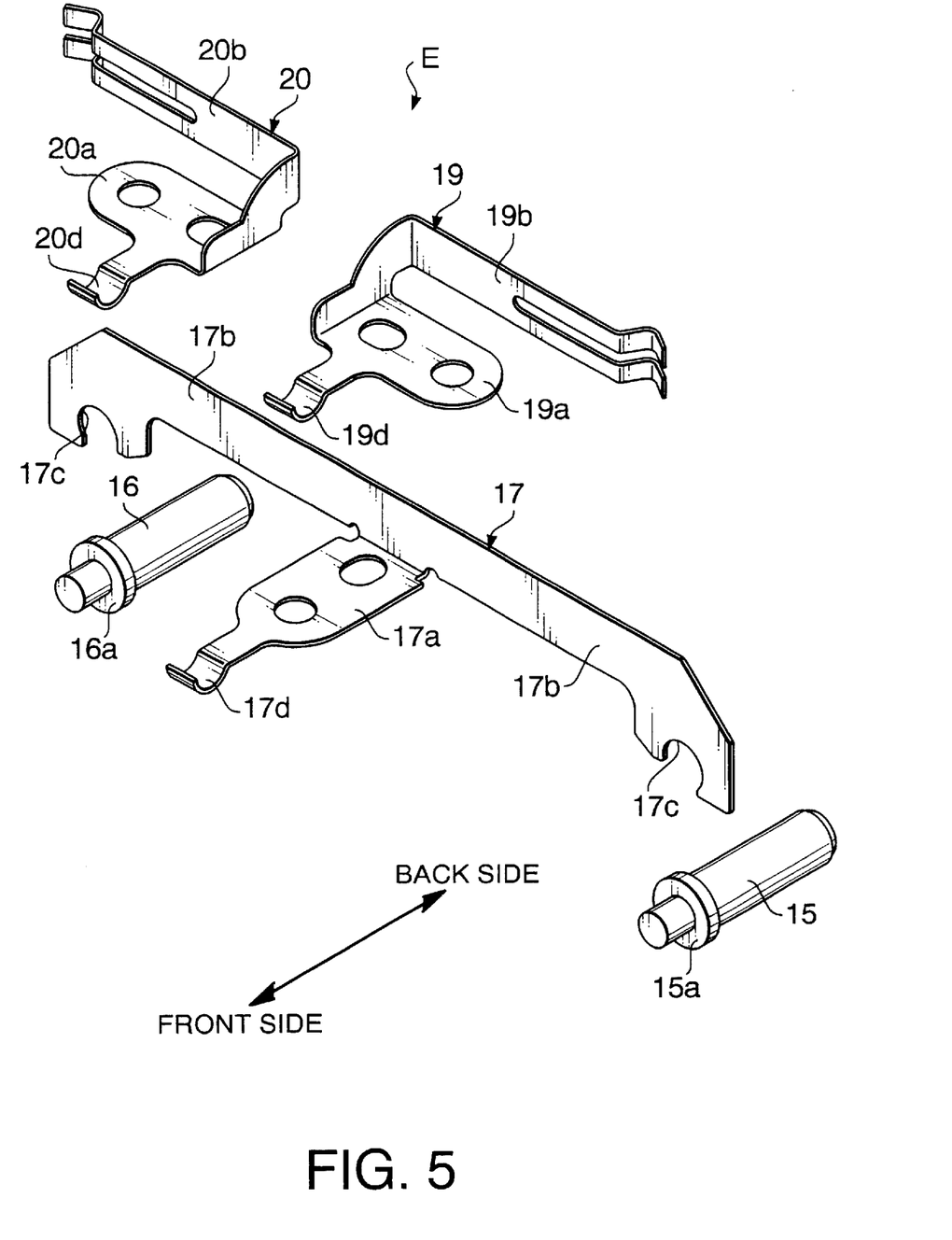
FIG. 5 shows an exploded perspective view of the switch unit.

FIG. 4 shows a perspective view of the switch unit E with the first and second rods 15 and 16 connected there to, and FIG. 5 shows an exploded perspective view of the switch unit E. A double headed arrow in FIG. 4 and 5 indicates the direction towards front and back sides of the camera 100.

As illustrated in FIG. 4 and 5, the switch mechanism E includes a common switch piece 17, a first switch piece 19 and a second switch piece 20, all of which are made from conductive material such as metal.

The common switch piece 17 is made by bending a generally T shaped metal sheet to form a mounting portion 17a, which is to be secured to the camera body 10, and two arms 17b extending laterally from the mounting portion 17a. The arms 17b can be bent elastically back and forth. A tab 17d is formed to a front end of the mounting portion 17a, which is to be electrically connected to the controller C. The end portions of the arms 17b protrude downwards, and generally semi-circular notches 17c are formed at the lower edges thereof. The semi-circular notches 17c engage with the front end portions of the first and second rods 15 and 16 from the upper side as shown in FIG. 4. The semicircular notches 17c have a smaller radius than that of the flanges 15 and 16 so that the arms 17b can abut against the flanges 15a and 16a.

The first switch piece 19 is also made from a metal sheet and has a mounting portion 19a with a tab 19d at its front end and an arm 19b extending from the mounting portion 19a. The end portion of the arm 19b is divided in two by a slit, and is bent to form a protrusion which contacts the arm 17b of the common switch piece 17.

The second switch piece 20 is made in a shape same as the first switch piece 19 but the left and right reversed. Thus, the second switch piece 20 includes a mounting portion 20a, a tab 20d, and an arm 20b as the first switch piece 20 has, however, the arm 20b extends in a direction opposite to that the arm 19b extends.

Referring again to FIG. 3a, the common, first and second switch pieces 17, 19, 20 are all provided in front of the back wall 10a of the camera body 10 by securing the mounting portions 17a, 19a, and 20a to the camera body by means of screws, for example.

The common switch 17 is arranged such that the arms 17b are located close to and in parallel with the back wall 10a. The first switch piece 19 is located at the corner between the left arm 17b and the mounting portion 17a of the common switch piece 17. The second switch piece 20 is located at a corner between the mounting portion 17a and the right arm 17b of the common switch piece 17. Both of the first and second switch pieces 19 and 20 have their arms 19b and 20b in the vicinity of the arms 17b of the common switch piece 17 to constitute, in combination with the common switch piece 17, the first switch S1 and the second switch S2, respectively.

The tabs 17d, 19d and 20d are all directed opposite to the back wall 10a and electrically connected with the controller C of FIG. 1 by lead wires, for example, not shown in FIG. 3a.

Stoppers 18 are provided between the left arm 17b and arm 19b, and between right arm 17b and arm 20b, which restrict the range in which the arms 17b can move forwards and the range the arm 19b and arm 20b can move backwards.

The arms 17b of the common switch piece 17, which are engaged with the front portion of the first and second rods 15 and 16 at their semi-circular notches 17c, bias the first and second rods 15 and 16 backwards by pushing the flanges 15a and 16a thereof until the flanges 15a and 16a abut against the back wall 10a. In this condition, the arms 17b are disconnected from the arms 19b and 20b and thus switches S1 and S2 are OFF. The end portions of the first and second rods 15 and 16 protrude from the holes 13 and 14 toward the back cover 21 and is in contact with the operation unit U.

Figure 6:
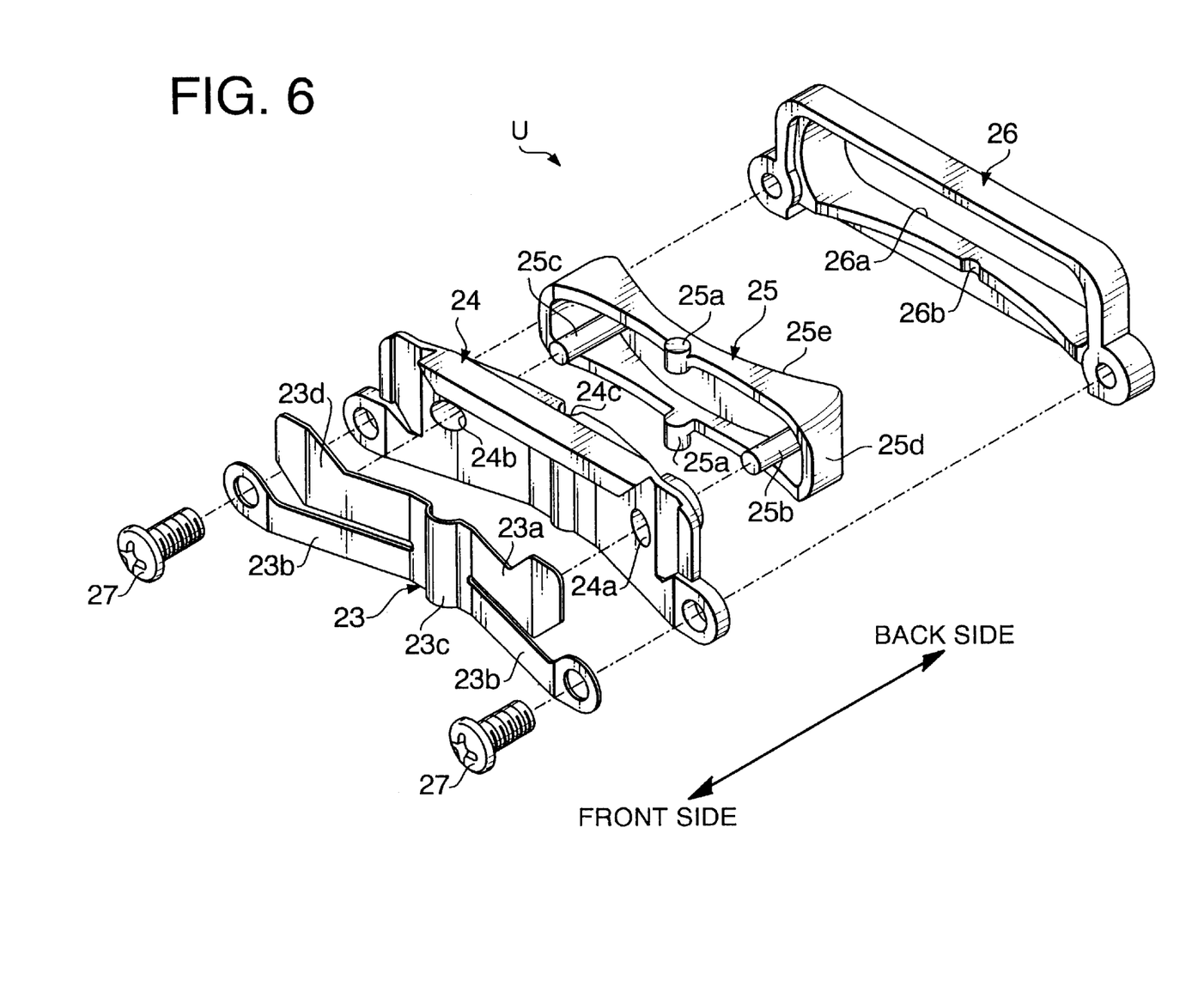
FIG. 6 is an exploded perspective view of an operation unit.

FIG. 6 is an exploded perspective view of the operation unit U. The operation unit U includes a spring member 23, a shading member 24, an operation member 25 and a cover member 26, which are assembled in this order from the front side of the camera 100 and secured to the back cover 21 by means of screws 27.

The spring member 23 is made from a metal sheet such that first and second spring arms 23a and 23d, which can elastically bend back and forth, extend symmetrically in lateral direction from a center portion 23c. A pair of mounting arms 23b also extend symmetrically in lateral direction from the center portion 23c, each of which has an opening at the end thereof for arranging a screw 27 therein.

The shading member 24, made from opaque material, has first and second through holes 24a and 24b and a vertically extending groove 24c formed on the back side of the shading member between the holes 24a and 24b.

The operation member 25 has a body 25d of which back side 25e is formed in a concave surface. Two short rotation shafts 25a, having vertical axes, are formed at the upper and lower front edge of the body 25d, respectively, so that they are located in the groove 24c of the shading member 24 as the operation unit U is assembled.

The operation member 25 also has first and second pressing pins 25b and 25c. As best seen in FIG. 3a, the first and second pressing pins 25b and 25c protrude forwards from the body 25d to penetrate the first and second through holes 24a and 24b, respectively, as the operation unit U is assembled, and abut against the first and second spring arms 23a and 23d of the spring member 23. The diameter of the first and second pressing pins 25b and 25c are smaller than that of the first and second through holes 24a and 24b so that the pressing pins 25b does not interfere with the inner walls of the holes 24a and 24b even if they are inclined at a small angle as shown in FIG. 3b and 3c.

Referring again to FIG. 6, the cover member 26 has an elongated opening 26a into which the body 25d of the operation member 25 is to be located as the operation unit U is assembled. Two notches 26b are formed to the front edge of the cover member 26, one to the upper portion (not shown) and the other to the lower portion, to sandwich the rotation shafts 25a of the operation member 25 with the groove 24c of the shading member 24 so that the operation member 25 can swing right and left about the rotation shafts 25a.

Referring back to FIG. 3a, when the operation unit U is assembled and secured to the back cover 21, the first and second spring arms 23a and 23d of the spring member 23 abut against the front surface of the shading member 24 over its entire length. In this state, the first and second spring arms 23a, 23d bias the first and second pressing pins 25b and 25c backwards so that the operating member 25 is kept in a neutral position, i.e., the operating member 25 is not inclined with respect to the outer surface of the back cover 21.

The end portions of the spring arms 23a, 23d are in contact with the tips of the rods 15 and 16, when the back cover is closed, so that the motion of the operation member 25 is transmitted to the rods 15 and 16 via the spring arms 23a and 23d. The rods 15 and 16, however, are disconnected from the operation unit U when the back cover 21 is opened, i.e., pivoted about the hinge mechanism 22. The disconnection between the rods 15, 16 and the operation unit U prevents the rods 15 and 16, and therefore the switch unit E, from being mechanical stressed due to the opening and closing of the back cover. Thus, the electrical connections between the switch unit E and the controller C will be not damaged even if the back cover 21 is opened and closed repetitiously for many times.

Now referring to FIG. 3b, if the back side 25e of the operation member 25 is pushed by a camera user so that the operation member 25 swings about the rotation shaft 25a in the clockwise direction in FIG. 3b, while the back cover 21 is kept closed, then the first pressing pin 25b of the operation member 25 moves forwards and urges the first spring arm 23a of the spring member 23 to bend it forwards. The bent first spring arm 23a, in turn, pushes forwards the back end of the first rod 15, preferably until the back end of the first rod 15 is flush with the back surface of the back wall 10a. The first rod 15 and therefore the flange 15a thereof moves forwards, bends the arm 17b of the common switch portion 17 so that arm 17b come into contact with the arm 19b of the first switch portion 19. Thus, the first switch S1 turns on, actuates the controller C to control the lens moving mechanism LM so that the focus length of the zoom lens system ZL becomes shorter.

If the camera user stops pushing the operation member 25, then both the first spring arm 23a of the spring member 23 and the arm 17b of the common switch piece 17 spring back to the position illustrated in FIG. 3a. Thereby, the operation member 25 is moved back to the neutral position, and the first rod 15 is moved back until the flange 15a abuts against the back wall 10a. Thus, the arm 17b of the common switch piece 17 is disconnected from the arm 19b of the first switch piece 19, and the controller C stops to actuate the lens moving mechanism LM. Note that, the stopper secures the disconnection between the arms 17b and 19b by restricting the backward movement of the arm 19b.

Referring to FIG. 3c, if the back side 25e of the operation member 25 is pushed so that the operation member 25 swings about the rotation shaft 25a in the counterclockwise direction in FIG. 3c, then the movement of the operation member 25 is transmitted to the second switch S2 by the second rod 16 in the same way as described with respect to FIG. 3b. Thus the second switch S2 turns on and the controller C controls the lens moving mechanism LM, in this case, such that the focus length of the zoom lens system ZL becomes longer.

As described above, by the camera 100 according to an embodiment of the invention, the switch unit E and the controller C are provided in the camera body, while the operation unit U is provided to the back cover. The motion of the operation member 25 of the operation unit U is mechanically transmitted to the switch unit E by the motion transmitting mechanism T, i.e., the first and second rods 15 and 16. Thus, the camera 100 does not have any lead wires or flexible boards for transmitting electrical signals between operation unit U and the switch unit E. In other words, the camera 100 does not have any lead wires or flexible boards between the camera body 22 and the back cover 21, which may be provided through the hinge mechanism 22 and therefore requires a complicated process of assembly, and may be broken if the back cover is opened and closed for many times.

Since the first and second rods 15 and 16 of the motion transmitting mechanism T are provided to the camera body 10 by utilizing spaces at the sides of the shaft space 12, the motion transmitting mechanism T is provided to the camera 100 without enlarging either of the camera body 10 or the back cover 21, or forming them in special shapes. That is, the camera 100 can utilize a camera body and a back cover having a shape the same as that of a conventional camera.

The invention has been described in detail with particular reference to the preferred embodiment thereof, but it will be understood that variations and modifications can be effected within the spirit and scope of the invention. For example, the operation member 25 may be a slide type instead of a swinging type. Further, the operation unit U may have two operation members, one for turning on/off only the first switch S1, and the other for turning on/off only the second switch S2. Furthermore, the motion transmitting T mechanism may be provided to the back cover 21 instead of to the camera body 10.

The present disclosure relates to the subject matter contained in Japanese Patent Application No. P2001-030777, filed on Feb. 7, 2001, which is expressly incorporated herein by reference in its entirety.

What is claimed is:

1. A camera, comprising:

a camera body having an inner space;

a cover mounted to said camera body to open and close said inner space;

an operation member movably mounted to said cover, said operation member being manually operable from outside said camera;

at least one switch provided in said camera body; and a motion transmitting mechanism provided between said at least one switch and said operation member, said motion transmitting mechanism switching a status of said at least one switch in response to an operation of said operation member.

2. The camera according to claim 1, wherein said at least one switch includes first and second switches, said camera executing a first operation when said first switch is ON and a second operation when said second switch is ON, and wherein said motion transmitting mechanism switches on said first switch when said operation member is at a first position, and switches on said second switch when said operation member is at a second position.

3. The camera according to claim 2, further comprising:

a zoom lens system provided to said camera body;

a lens moving mechanism provided to said camera body, said lens moving mechanism moving one or more lenses of said zoom lens system to vary a focal length of said zoom lens system; and a controller provided to said camera body and connected to both said first and second switches, said lens moving mechanism being controlled by said controller such that said focal length decreases when said first switch is ON, and such that said focal length increases when said second switch is ON.

4. The camera according to claim 1, wherein said inner space is a film cartridge space for accommodating a film cartridge, and wherein said cover is a back cover mounted to a back side of said camera body to open and close said film cartridge space.

5. The camera according to claim 4, wherein said film cartridge space includes a shaft space formed in a back wall of said camera body, said shaft spade accommodating a shaft protruding from said film cartridge, and wherein said motion transmitting mechanism is provided to said back wall at the vicinity of said shaft space.

6. The camera according to claim 1, wherein said at least one switch is provided to said camera body such that a back wall of said camera body is located between said at least one switch and said operation member, and wherein said motion transmitting mechanism includes a rod supported slidably in a through hole formed in said back wall, said rod being urged towards said at least one switch by said operation member as said operation member being moved in a predetermined direction, and thereby switching on said at least one switch.

7. The camera according to claim 1, wherein said motion transmitting mechanism is provided to said camera body such that said motion transmitting mechanism is disconnected from said operation member when said cover is opened.

8. The camera according to claim 1, wherein said motion transmitting mechanism is provided to said back cover such that said motion transmitting mechanism is disconnected from said operation member when said cover is opened.

9. A camera, comprising:

a camera body;

a cover openably mounted onto said camera body;

at least one electrical device provided in said camera body, said at least one electrical device being mechanically operated to change status thereof;

a manually operable member mounted on said cover, said manually operable member being electrically disconnected from said at least one electrical device; and a motion transmitting mechanism that transmits an operation of said manually operable member to said at least one electrical device.

* * * * *